M. ARNDT.
INDICATOR.
APPLICATION FILED JUNE 11, 1903.
927,207.
Patented July 6, 1909.
2 SHEETS—SHEET 1.
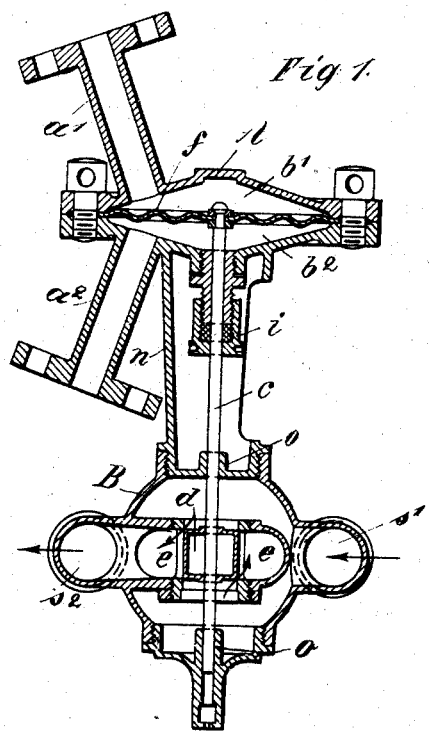
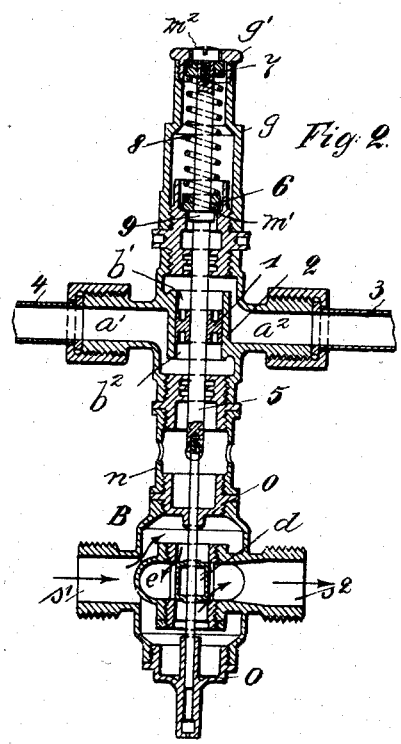
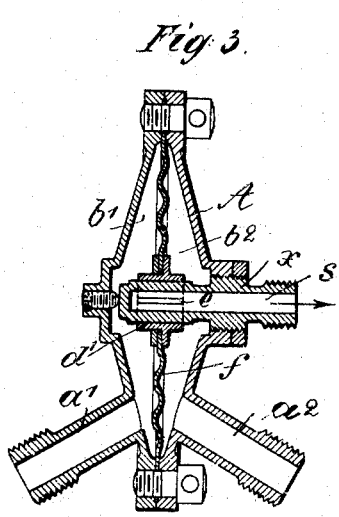
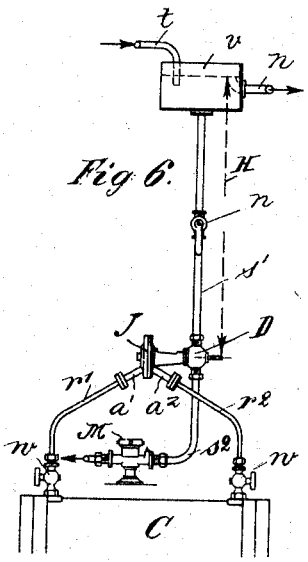
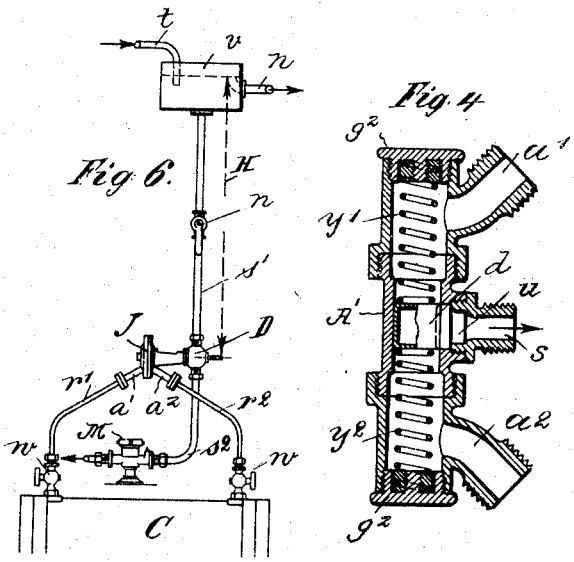
Witnesses:
R. H. Sommers
M. J. L. Higgins.
Inventor
Max Arndt
by Henry Orth
atty.

M. ARNDT.
INDICATOR.
APPLICATION FILED JUNE 11, 1903.
927,207.
Patented July 6, 1909.
2 SHEETS—SHEET 2.
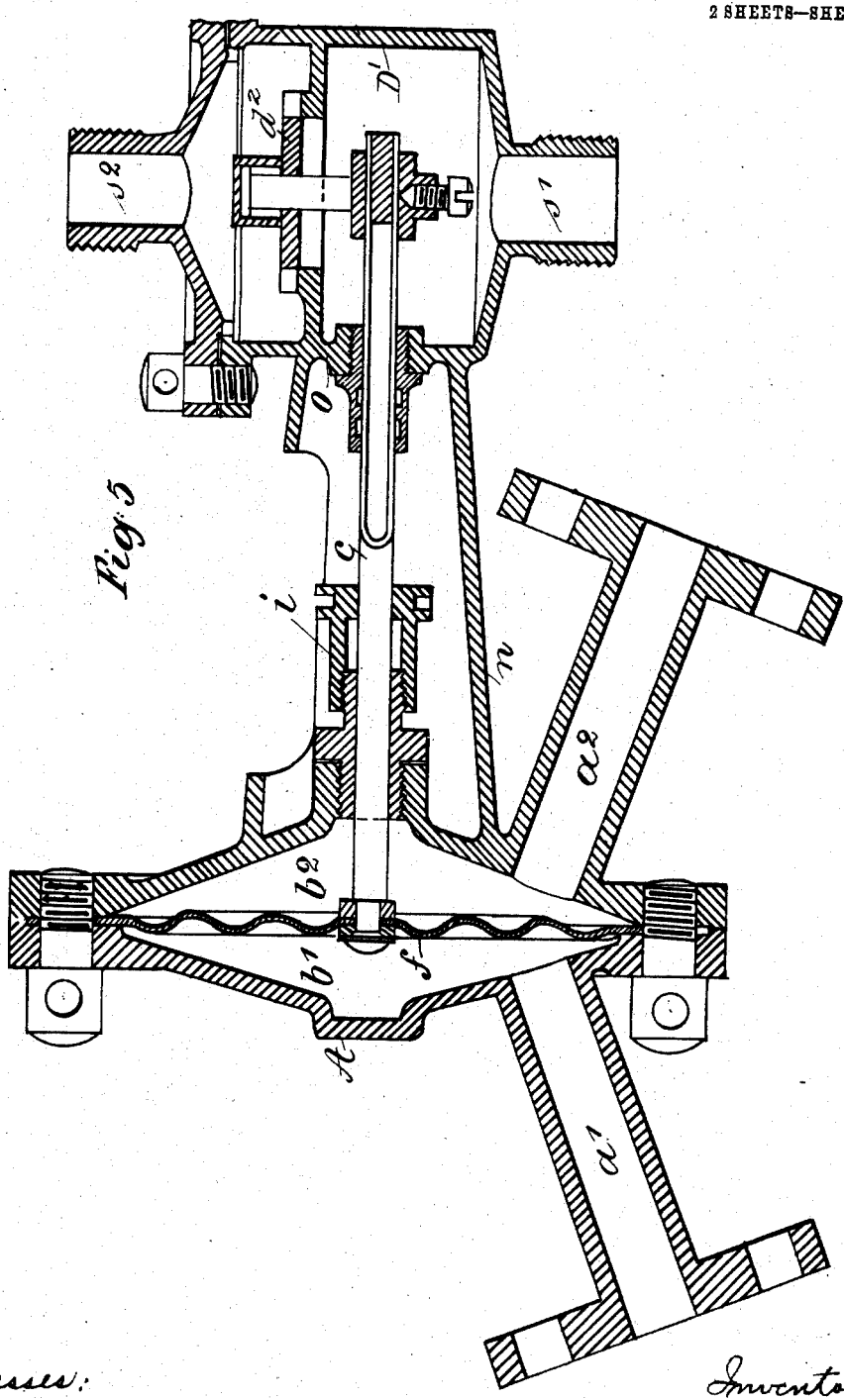
Witnesses:
Bt Sommers
M. J. L. Higgins.
Inventor,
Max Arndt
by Henry Orth
Attys.

UNITED STATES PATENT OFFICE.

MAX ARNDT, OF AIX-LA-CHAPELLE, GERMANY.

INDICATOR.

No. 927,207.      Specification of Letters Patent.      Patented July 6, 1909.

Application filed June 11, 1903. Serial No. 161,115.

*To all whom it may concern:*

Be it known that I, MAX ARNDT, a subject of the King of Prussia, German Emperor, residing at the city of Aix-la-Chapelle, in the Kingdom of Prussia, German Empire, have invented certain new and useful Improvements in Indicators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to indicators to determine average pressure. For this purpose I combine with an indicator or measure of well known construction, a pressure-controlled member, directly operated by the fluid whose pressure is to be measured, that permits a quantity of liquid, steam, air or other gas to pass to or through the measure, said quantity depending upon the average indicator pressure for the time being.

Referring to the drawings in which like parts are similarly designated—Figure 1 is a section through the indicator. Fig. 2 is a section through a modified form thereof. Fig. 3 is a section of a second modification. Fig. 4 is a section of a third modification. Fig. 5 is a section of a fourth modification. Fig. 6 shows the indicator, Fig. 1, connected to the cylinder of an engine and a tank (shown in section) from which the passage of water to the meter M is controlled by the indicator.

Referring to Fig. 1, $a'$ and $a^2$ are flanged pipes by means of which the pressure controlled member is connected to the engine cylinder on each side of the piston therein and said member consists of a steam chamber A divided, by a spring controlled element, in this case, a flexible partition or diaphragm $f$, into two compartments $b'$ and $b^2$, each of which is supplied by steam from an end of the engine cylinder to be indicated by one of the pipes $a'$ and $a^2$. Secured to the diaphragm $f$ is a rod $c$ extending through a stuffing box $i$ of chamber A and guided in bearings $o$, $o$, that carries a piston valve $d$ located in casing B, which is connected to and supported from the casing containing chamber A by a neck $n$. The casing B is provided with an inlet passage $s'$ and an outlet passage $s^2$, the latter leading from an annular chamber $e$. The passage of liquid into chamber $e$ and out through $s^2$ is controlled by the piston valve $d$.

The apparatus operates as follows: Each of the pipes $a'$ and $a^2$ is connected to an end of the cylinder of the engine. The pressures in front of and behind the piston are communicated to chambers $b'$ and $b^2$ and move the diaphragm $f$, the rod $c$ and piston valve $d$. The flow of fluid, in this case water, entering casing B by passage $s'$ is controlled by the valve $d$ in its passage through $s^2$ to the water meter or other device. When the diaphragm $f$ is stationary no water can flow from chamber B through $e$ and $s^2$. The quantity of fluid that escapes through $s^2$ corresponds to the average pressure in the engine cylinder, so that it is only necessary to measure it in order to ascertain the average pressure.

In the modification shown in Fig. 2, instead of a diaphragm I use a spring controlled piston that moves the piston valve. A piston 1 moves in an open ended cylinder 2, each end communicating respectively with chambers $b'$ and $b^2$ that by means of $a'$, $a^2$ and 4, 3 are connected to the engine cylinder. The piston 1 is carried by a rod 5 whose upper end projects into casing $g$ closed by a screw cap $g'$. On the rod is an abutment 9 that takes against a loose collar 6 to which one end of the spiral spring 8 is connected, the other end of said spring being connected to a similar collar 7. The rod passes through both collars freely and has a screw $m^2$ in its end, said screw engaging the upper collar 7 when the rod is moved in one direction, the lower collar being then limited by a shoulder $m'$ from moving downward. The screw cap $g'$ limits the movement of the upper collar 7 when the rod 5 is moved in the opposite direction, the abutment 9 then taking against the lower collar 6. The lower end of the rod 5 or a section thereof passes into a casing D, carries a valve $d$ that controls chamber $e$ and passage $s^2$, all of a construction similar to that described with reference to Fig. 1.

In Fig. 3, the casing A is similar to that shown in Fig. 1, the diaphragm $f$ in this case carries a sleeve $d'$ that controls the opening of slots $e$ in a pipe $s$ closed at one end, that projects into chamber A.

In the modification, Fig. 4, $a'$ and $a^2$ are nipples or short pipes to connect the device to each end of the cylinder as before. A' is a cylindrical casing closed at its ends by screw-plugs $g^2$ and having two lateral passages $u$ and an outlet pipe $s$. A piston $d$, the same length as the passage $u$, controls them and is located between two spiral springs $y'$ and $y^2$. When the piston is moved by differential pressure, that is, the resultant of the two opposing pressures on opposite sides of the piston $d$, the passages $u$ are uncovered for the passage of fluid through $s$.

In the two forms shown in Figs. 3 and 4 the steam or water is permitted to escape through the nipples or pipes $s$, and the amount of fluid so escaping is proportional to the differences of the pressures.

In the form shown in Fig. 5, the casing A is similar to that shown in Fig. 1, the rod $c$ being connected to the diaphragm $f$ that divides the casing A in chambers $b'$ and $b^2$. The rod $c$ passes through the stuffing box $o$ of casing $D'$ and operates the slide valve $d^2$ to control the passage of fluid through the casing.

In Fig. 6, I have shown the manner of connecting the device to a steam engine cylinder C. Pipes $r'$ and $r^2$ connect the short pipes $a'$ and $a^2$ to the cocks $w, w$, as shown and the casing D is connected by pipe $s'$ to a tank $v$ fed by a pipe $t$ and provided with an overflow pipe $n$. A cut-off valve $n'$ is located in pipe $s'$. Pipe $s^2$ is connected to a suitable water meter indicated at M. When the cock $n'$ is opened water in chamber D is under a constant head H and the quantity of water allowed to pass through D by the controlling member therein is measured by the meter.

Having thus described my invention, what I claim as new therein and desire to secure by Letters Patent, is:—

1. An indicator for continuous indication comprising in combination with means to supply a liquid under constant head and a meter for said liquid; a valve slidable in opposite directions to control the flow of liquid to the meter, and flexible means actuated by differential pressure to slide the valve, said valve cutting off the passage of liquid to the meter when the valve is balanced.

2. In an indicator, a casing having a water inlet, an annular casing therein open at both ends and having a water outlet, a valve normally closing the ends of the annular casing, a steam chamber, a movable element dividing the chamber into two parts, means to admit steam from opposite ends of a steam cylinder to opposite sides of the movable element and a rod connecting the movable element and valve, substantially as described.

3. In an indicator, a casing having a water inlet, a valve casing therein having a water outlet, a valve controlling the passage of water from the outer to the inner casing, a steam chamber, a spring controlled member dividing the steam chamber into two parts, means to admit steam to each part of the steam chamber and a rod connecting said member and valve, substantially as described.

In testimony that I claim the foregoing as my invention, I have signed my name in presence of two subscribing witnesses.

MAX ARNDT.

Witnesses:
HENRY QUOIDFLIEG,
E. M. BRUNDAGE.